Aug. 28, 1934.  A. A. HEIMROD  1,971,855
METHOD OF PURIFYING SULPHUR DIOXIDE BEARING GASES
AND MANUFACTURING SULPHUR TRIOXIDE THEREFROM
Filed Aug. 12, 1930  2 Sheets-Sheet 1

INVENTOR.
Albert A. Heimrod
BY
ATTORNEYS.

Aug. 28, 1934.  A. A. HEIMROD  1,971,855
METHOD OF PURIFYING SULPHUR DIOXIDE BEARING GASES
AND MANUFACTURING SULPHUR TRIOXIDE THEREFROM
Filed Aug. 12, 1930   2 Sheets-Sheet 2

INVENTOR.
Albert A. Heimrod
BY
ATTORNEYS.

Patented Aug. 28, 1934

1,971,855

UNITED STATES PATENT OFFICE 1,971,855

METHOD OF PURIFYING SULPHUR DIOXIDE BEARING GASES AND MANUFACTURING SULPHUR TRIOXIDE THEREFROM

Albert A. Heimrod, Great Neck, N. Y., assignor to International Precipitation Company, Los Angeles, Calif., a corporation of California Application August 12, 1930, Serial No. 474,806

2 Claims. (Cl. 23—178)

This invention relates to the manufacture of sulphur trioxide, and eventually of sulphuric acid, by the well known contact process, from gases containing sulphuric dioxide and oxygen, such gases consisting, for example, of so-called "burner-gases", produced by the burning of sulphur or of sulphur bearing material, or of gases arising from converters or other metallurgical heating apparatus and containing considerable quantities of sulphur dioxide gas, or being obtained in any other suitable manner. In any event the sulphur dioxide content of such gases is produced by the partial oxidization of sulphur in the burners, converters, or other apparatus, the conditions being such that other materials associated with the sulphur in the material being treated are also volatilized and appear as impurities in the sulphur dioxide bearing gases and are of such nature as to act as "poisons" for the catalytic material employed in the contact process of converting sulphur dioxide to sulphur trioxide, that is to say, they tend to destroy the effectiveness of the catalytic agent.

The principal object of this invention is to provide an improved method for treating the sulphur dioxide bearing gases to effect substantially complete removal of such objectionable impurities therefrom. The impurities which it is desired to remove may be present in the gases in the form of vapor, liquid or solid particles, or may be originally present as vapor but subsequently condensed to form a finely divided fume or mist in suspension in the gases. A particularly objectionable impurity of this latter class consists of arsenic compounds, which are not only very detrimental to the catalyzing agent if allowed to remain in the gas but are also particularly difficult of removal therefrom due to their tendency to condense as extremely finely divided particles in suspension in the gases. The invention, therefore, is directed particularly to the removal of arsenic compounds, but may also be used for the removal of any other such objectionable impurities from the gases.

The invention may be considered as comprising not only an improved method for purifying the gases for use in the contact process of sulphuric acid manufacture, but also an improved process for manufacturing sulphur trioxide including this novel means of purification, particularly inasmuch as a preferred embodiment of the invention provides for return of a portion of the sulphur trioxide produced, for use in effecting the purification.

The method of purification of sulphur dioxide bearing gases according to my invention comprises essentially introducing sulphur trioxide gas into the gases to be purified and also spraying water into such gases in finely divided condition, for the purpose of cooling the gases and causing combination of the sulphur trioxide with water vapor and condensation thereof in the form of a mist consisting of finely divided particles of dilute sulphuric acid. The condensed fume or mist particles of impurities contained in the gases seem to act as nuclei for condensation of this sulphuric acid mist, and the resulting condensation of sulhpuric acid about the individual suspended particles of impurities causes the size of the particles to increase sufficiently to permit substantially complete removal thereof by subsequent electrical precipitation. Following this conditioning operation, the gases are then subjected to electrical precipitation to remove therefrom the sulphuric acid mist together with the impurities entrained therein. The gases, subsantially freed of objectionable impurities, may then be subjected to any necessary further treatment, such as dehydrating and preheating, and may be subsequently passed to the contact apparatus and brought into contact in the usual manner with the catalytic agent therein which may consist, for example, of finely divided platinum or other material, so as to form sulphur trioxide by reaction of oxygen contained in the gases with the sulphur dioxide.

According to a preferred embodiment of the invention, a portion of the gases leaving the contact apparatus and containing the sulphur trioxide thus formed is continually diverted and returned for introduction into the gases in the purifying operation.

It is to be understood that the purification of the sulphur dioxide bearing gases and the manufacture of sulphur trioxide therefrom as above described is preferably effected as a final cleaning operation, for the purpose of removing the last remaining traces of difficultly removable suspended impurities, and may be carried out in conjunction with any other preliminary means for effecting partial cleaning or purification of the gases.

The accompanying drawings illustrate an arrangement of apparatus suitable for carrying out my invention, including both preliminary cleaning means, and also final cleaning means adapted for carrying out the cleaning operation as above described, and referring thereto:

Figure 1:
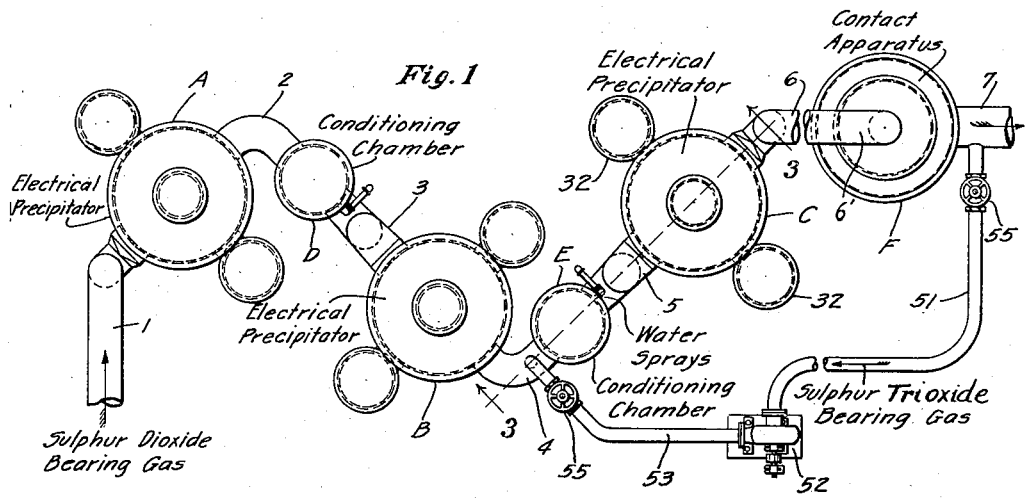
Fig. 1 is a plan view of such apparatus, also showing the contact apparatus and the means for returning part of the sulphur trioxide gas for use in the final purification.
Figure 2:
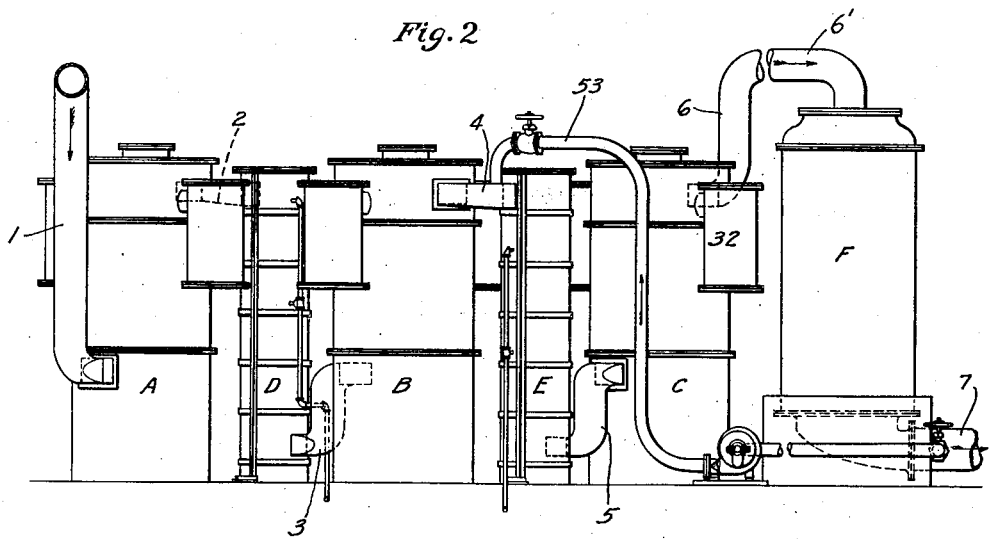
Fig. 2 is a side elevation of the apparatus shown in Fig. 1.

In the apparatus shown in Figs. 1 and 2, I have shown three electrical precipitators designated at A, B, and C, and two spraying or conditioning towers indicated at D and E. The contact apparatus is indicated at F and may be of any suitable or well known type and provided with masses of suitable catalytic material with which the gas is brought into contact in passing therethrough. In this arrangement of apparatus the final cleaning of the gases as above described is effected in the second conditioning tower E and the last electrical precipitator C, the first two precipitators and the first conditioning tower D being provided for preliminary cleaning of the gases prior to this final cleaning. The sulphur dioxide bearing gases are first introduced into precipitator A through pipe 1. From the outlet of this precipitator the gases are conducted by pipe 2 to the conditioning chamber D, thence by pipe 3 to the electrical precipitator B, and thence by pipes 4, 5, 6 and 7 through the conditioning tower E, precipitator C, contact apparatus F, and thence to any suitable means for ultimate conversion of the sulphur trioxide to sulphuric acid or for any desired further disposition thereof. It will be understood that any suitable apparatus, such as the usual drying towers and preheating means, may be connected between the pipes 6 and 6', but such apparatus need not be shown nor particularly described herein, as it forms no part of the present invention and is immaterial thereto.

Figure 3:
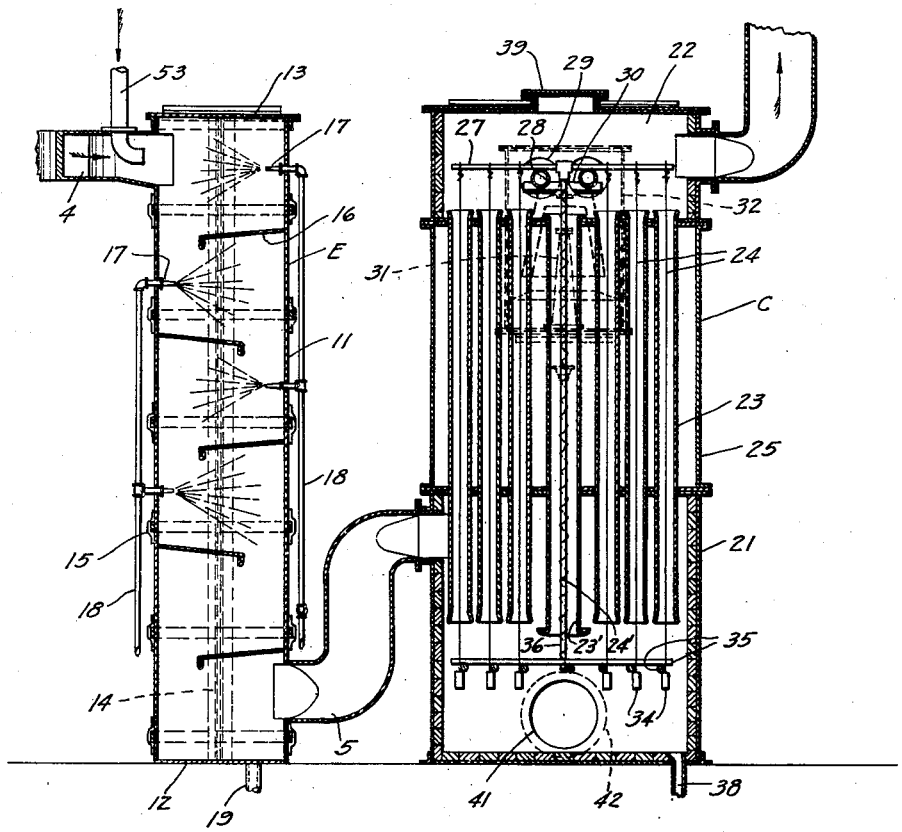
Fig. 3 is a vertical section on line 3—3 in Fig. 1.

Inasmuch as the final purification, to which this invention particularly pertains, is carried out in the conditioning tower E and precipitator C, I have shown these parts of the apparatus in somewhat greater detail in Fig. 3. The conditioning tower D, however, is or may be of substantially the same construction as the tower E and the electrical precipitators A and B are or may be of substantially the same construction as the precipitator C.

The humidification or conditioning tower E is shown as comprising an upright cylindrical shell 11 provided with a bottom wall 12 and a cover 13 and supported in any suitable manner, as by vertical supporting members 14 and annular straps or bands 15. Spaced at intervals throughout the height of said tower are a plurality of baffle plates 16, alternate plates projecting from opposite sides of the tower so as to provide a tortuous or zigzag path of gas flow through the tower. The baffles are shown as inclined downward toward their free edges, so as to permit drainage of liquid therefrom. The inlet flue 4 is shown as connected adjacent the top of the tower and the outlet flue 5 adjacent the bottom thereof. Spray nozzles 17 adapted to produce finely divided sprays of water are provided at suitable positions in the tower, so as to thoroughly humidify and cool the gases passing therethrough. Water may be supplied to said sprays by supply pipes 18. A drain pipe 19 leads from the bottom of the tower for removing the liquid collected therein.

The electrical precipitator C is shown as comprising a bottom header 21, an upper header 22, a plurality of pipes or tubes constituting the collecting electrodes and opening at their lower and upper ends into the respective headers, and a plurality of wires or rods of small diameter indicated at 24 supported so as to extend centrally within the respective collecting electrode pipes and insulated therefrom, constituting the discharge electrodes. The pipes 23 are shown as enclosed within a cylindrical shell or housing 25, while the lower ends of said pipes project downwardly into the bottom header 21 below the level of the opening of the precipitator inlet pipe 5.

The discharge wires 24 are shown as supported on rods or frame members 27 which are in turn supported on transversely extending pipes or rods 28. The supporting members 28 extend through openings 29 in the side walls of the upper header compartment 22 and rest at each end upon a supporting bar 30, which is in turn carried by an insulating support shown in dotted lines at 31. The insulating supports 31 at the respective ends of the supporting bars 28 are mounted in insulator compartments 32 at the opposite sides of the precipitator housing, one of said insulator compartments being shown in dotted lines in Fig. 3 and both of side compartments being shown in Fig. 1. The lower ends of the discharge electrode wires 34 may be provided with weights 34 for tensing the same and holding them in proper position in the pipes. The lower ends of said wires may be further positioned by means of a grid 35 which may be supported by means of a rigid rod or supporting member 36 which extends upwardly through a central pipe 23' and is also carried by the supporting members 28. In order to provide electric discharge within the pipe 23' as well as the pipes 23, there may be provided a wire discharge member 24' wound in helical fashion upon the rigid supporting member 26, the pipe 23' being of somewhat larger diameter than the pipes 23 so as to provide substantially the same space between wire 24' and pipe 23' as between wires 24 and pipes 23. As the material to be precipitated consists principally or largely of liquid, it will run down the surfaces of the electrodes and into the lower header 21, whence it may be removed by drain pipe 38. The precipitator may be provided with a removable cover plate 39 through which a hose may be introduced for flushing or washing out the precipitator if found necessary. The lower header 21 may also be provided with a man hole 41 for permitting access to the interior thereof, said man hole being normally closed by door 42.

It will be understood that the discharge electrode system and the collecting electrode system may be connected in any suitable manner to the opposite terminals of a suitable source of electric current at sufficient voltage to maintain electric discharge, said electric current being preferably unidirectional, such as produced, for example, by the rectification of alternating current. The collecting electrodes are also preferably grounded.

The electrical precipitator above described is adapted particularly for collection of wet material, that is to say, a material containing sufficient water or other liquid to form a fluid precipitate on the electrodes, which runs down the surfaces thereof and collects in the bottom of the lower header 21, whence it may be removed through drain pipe 38. In the particular installation shown, the gases delivered through flue 1 to the first precipitator A are contemplated as being already in a moist or humidified condition, resulting from the passage thereof through a wet scrubber or other device adapted to effect coarse cleaning of the gases and cause the presence of a considerable amount of moisture in the gases, and under these conditions this first electrical precipitator A, as well as the precipitators B and C, may be of the type above described. It will be understood, however, that if the gases entering the system are not already humidified or moistened, with the result that the precipitate collected in the first precipitator would be in a substantially dry condition, an electrical precipitator construction better adapted to the handling of dry materials may be used as the first precipitator in the system.

According to a preferred embodiment of my invention, the gases in the first conditioning tower D are sprayed with water admitted through the spray nozzles thereof. In the second conditioning chamber, on the other hand, I prefer to both spray the gases with water and also admix a certain proportion of sulphur trioxide gas therewith, so as to form a mist of dilute sulphuric acid by combination and condensation of the sulphur trioxide and water vapor as above described. For this purpose I have shown a pipe 51 leading from the outlet 7 of the contact apparatus to a fan or blower 52, and a pipe 53 leading from said fan or blower to the gas conducting system adjacent the point of entrance of the gases into the conditioning chamber E. For example, the pipe 53 may, as shown, open into the flue 4, adjacent the point of connection of said flue to the conditioning tower E. The pipes 51 and 53 may be provided with any suitable form of valve or damper means 55 for controlling the quantity of sulphur trioxide gas returned therethrough and also for entirely shutting off these pipes from the rest of the system if so desired. The cleaning of the sulphur dioxide bearing gases according to my invention may be carried out in the above described apparatus as follows:

The sulphur dioxide bearing gases entering through flue 1, normally containing finely divided dust or fume in suspension and also containing suspended particles of condensed water vapor, or of water mechanically carried over from the wet coarse cleaning apparatus above referred to, are first partially cleaned in the first electrical precipitator A, which removes the greater portion of the condensed water vapor and also a considerable proportion of the suspended solid particles either separately or adhering to the condensed water particles. The gases then pass to the conditioning tower D, wherein they are further humidified and cooled by the water sprayed into the gases. This cooling causes further condensation of water vapor from the gases producing an additional quantity of mist or fog of condensed water particles which largely form about the finer suspended solid particles as nuclei. The water sprayed into the gases may not be entirely evaporated, but some of the original spray particles may either remain in suspension in the gas and be carried along thereby or may settle out of the gas and collect at the bottom of the humidifying chamber. These residual water particles may also entrap suspended particles and thus assist in cleaning the gas. The gases then enter the second electrical precipitator B wherein the suspended water particles, together with solid particles either contained therein or separate, are precipitated. The gases leaving the second electrical precipitator B are, therefore, already freed of a considerable proportion of the suspended impurities originally contained therein, but still contain very finely divided fume particles of arsenic compounds or other objectionable impurities in sufficient amount to seriously affect the efficiency of the catalyst in the contact apparatus if allowed to remain therein.

The gases passing through flue 4 receive a certain proportion of sulphur trioxide gas admitted through pipe 53, the amount of sulphur trioxide gas so introduced being controlled by the operation of fan or blower 52 and by regulation of valves 55, and being sufficient to cause formation of the desired quantity of sulphuric acid mist of the desired strength. The gases containing this added sulphur trioxide then pass downwardly through the humidifying chamber E and the water sprayed into such gases in finely divided form through the nozzles 17 acts to further cool and humidify the gases and cause condensation of finely divided mist particles of dilute sulphuric acid formed by combination of the sulphur trioxide with the water vapor. The condensation of sulphuric acid from vapors or gases containing the same takes place in the form of a relatively large number of very finely divided particles, and a large number of these particles tend to form about the remaining finely divided suspended particles of impurities, such as arsenic compounds, which act as nuclei causing the condensation to occur on these particles rather than in the portions of the gas stream between the particles. The remaining objectionable impurities are thus largely absorbed in or caused to adhere to the particles of sulphuric acid mist, so that upon passage of the gases through the final electrical precipitator C, these impurities are precipitated and collected along with the sulphuric acid mist. In this stage also, some water sprayed into the gases may remain unevaporated, and may also assist in the cleaning of the gases by entrainment of suspended particles therewith. In any event, the final electrical precipitation operation effects a substantially complete removal of both suspended liquid particles and suspended impurities.

The gases, thus substantially freed of all objectionable impurities but still containing substantially the entire original sulphur dioxide content and also containing oxygen, may then be subjected to any desired further preparatory treatment, such as dehydration and preheating in the usual manner, after which they pass to the contact apparatus F wherein the oxygen contained therein is caused to react with the sulphur dioxide, in the presence of the catalytic agent, to form sulphur trioxide. A portion of the sulphur trioxide bearing gases leaving the contact apparatus is returned to the final cleaning operation through pipes 51 and 53 as above described, while the remainder passes to any suitable apparatus for conversion to sulphuric acid or for further treatment in any suitable manner.

I claim:

1. The method of removing objectionable suspended impurities from sulphur dioxide bearing gases for use in making sulphur trioxide by the contact process which comprises humidifying said gases and introducing gaseous sulphur trioxide thereto, then cooling and further humidifying said gases to cause formation of condensed sulphuric acid mist particles, and then subjecting the gases to electrical precipitation to remove therefrom said sulphuric acid mist particles containing said suspended impurities.

2. The method of removing objectionable suspended impurities from sulphur dioxide bearing gases for use in making sulphur trioxide by the contact process which comprises introducing sulphur trioxide gas into said gases, then spraying the gases with water to humidify and cool the same and cause condensation of sulphuric acid mist particles upon said suspended impurities, due to combination and condensation of water vapor and sulphur trioxide, and then subjecting the gases to electrical precipitation to remove sulphuric acid mist particles containing said suspended impurities.

ALBERT A. HEIMROD.